(12) United States Patent
Owen et al.

(10) Patent No.: US 8,589,629 B2
(45) Date of Patent: Nov. 19, 2013

(54) METHOD FOR WAY ALLOCATION AND WAY LOCKING IN A CACHE

(75) Inventors: Jonathan Owen, Northborough, MA (US); Guhan Krishnan, Chelmsford, MA (US); Carl D. Dietz, Round Rock, TX (US); Douglas Richard Beard, Austin, TX (US); William K. Lewchuk, Pflugerville, TX (US); Alexander Branover, Chestnut Hill, MA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 273 days.

(21) Appl. No.: 12/413,124

(22) Filed: Mar. 27, 2009

(65) Prior Publication Data

US 2010/0250856 A1 Sep. 30, 2010

(51) Int. Cl.
*G06F 12/00* (2006.01)
(52) U.S. Cl.
USPC ..... 711/130; 711/145; 711/129; 711/E12.038
(58) Field of Classification Search
None
See application file for complete search history.

(56) References Cited

U.S. PATENT DOCUMENTS

| | | | |
|---|---|---|---|
| 5,412,787 A | 5/1995 | Forsyth et al. |
| 5,764,946 A | 6/1998 | Tran et al. |
| 5,802,594 A | 9/1998 | Wong et al. |
| 5,845,323 A | 12/1998 | Roberts et al. |
| 5,848,433 A | 12/1998 | Tran et al. |
| 6,016,533 A | 1/2000 | Tran |
| 6,044,478 A | 3/2000 | Green |
| 6,073,230 A | 6/2000 | Pickett et al. |
| 6,138,213 A | 10/2000 | McMinn |
| 6,282,644 B1 | 8/2001 | Ko |

(Continued)

FOREIGN PATENT DOCUMENTS

| | | |
|---|---|---|
| EP | 1513062 | 3/2005 |
| EP | 1612683 | 1/2006 |
| EP | 1862906 | 12/2007 |

OTHER PUBLICATIONS

Powell M D et al: "Reducing set-associative cache energy via way-prediction and selective direct-mapping" Microarchitecture, 2001. Micro-34. Proceedings. 34th ACM/IEEE International Symposium on Dec. 1-5, 2001, Piscataway, NJ USA, pp. 54-65.

(Continued)

*Primary Examiner* — Reginald Bradgon
*Assistant Examiner* — Baboucarr Faal
(74) *Attorney, Agent, or Firm* — Rory D. Rankin; Meyertons, Hood, Kivlin, Kowert & Goetzel, P.C.

(57) ABSTRACT

A system and method for data allocation in a shared cache memory of a computing system are contemplated. Each cache way of a shared set-associative cache is accessible to multiple sources, such as one or more processor cores, a graphics processing unit (GPU), an input/output (I/O) device, or multiple different software threads. A shared cache controller enables or disables access separately to each of the cache ways based upon the corresponding source of a received memory request. One or more configuration and status registers (CSRs) store encoded values used to alter accessibility to each of the shared cache ways. The control of the accessibility of the shared cache ways via altering stored values in the CSRs may be used to create a pseudo-RAM structure within the shared cache and to progressively reduce the size of the shared cache during a power-down sequence while the shared cache continues operation.

21 Claims, 7 Drawing Sheets

(56) References Cited

U.S. PATENT DOCUMENTS

| | | |
|---|---|---|
| 6,314,514 B1 | 11/2001 | McDonald |
| 6,493,800 B1 | 12/2002 | Bumrich |
| 6,629,207 B1 | 9/2003 | Yoshioka et al. |
| 7,117,290 B2 | 10/2006 | Shen et al. |
| 2003/0065886 A1 | 4/2003 | Olarig et al. |
| 2005/0050278 A1 | 3/2005 | Meier et al. |
| 2006/0143390 A1* | 6/2006 | Kottapalli ............... 711/130 |
| 2007/0220247 A1* | 9/2007 | Lee et al. ............... 713/2 |
| 2009/0172449 A1* | 7/2009 | Zhang et al. ............... 713/324 |

OTHER PUBLICATIONS

International Search Report and Written Opinion Application No. PCT/US2010/028892 mailed Jul. 6, 2010.

\* cited by examiner

METHOD FOR WAY ALLOCATION AND WAY LOCKING IN A CACHE

BACKGROUND OF THE INVENTION

1. Field of the Invention

This invention relates to computing systems, and more particularly, to data allocation in a shared cache memory of a computing system.

2. Description of the Relevant Art

Modern microprocessors may include one or more processor cores, or processors, wherein each processor is capable of executing instructions of a software application. These processors are typically pipelined, wherein the processors include one or more data processing stages connected in series with storage elements (e.g. registers and arrays) placed between the stages. Although the pipeline may be divided into any number of stages at which portions of instruction processing are performed, instruction processing generally comprises fetching the instruction, decoding the instruction, executing the instruction, and storing the execution results in the destination identified by the instruction.

Ideally, every clock cycle produces useful execution of an instruction for each stage of a pipeline. However, a stall in a pipeline may cause no useful work to be performed during that particular pipeline stage. One example of a stall, which typically is a multi-cycle stall, is a data-cache or an instruction-cache miss A method to reduce performance loss is to reduce the occurrence of multi-cycle stalls.

A microprocessor may be coupled to one or more levels of a cache hierarchy in order to reduce the latency of the microprocessor's request of data in memory for a read or a write operation. Generally, a cache may store one or more blocks, each of which is a copy of data stored at a corresponding address in the system memory. As used herein, a "block" is a set of bytes stored in contiguous memory locations, which are treated as a unit for coherency purposes. As used herein, the terms "cache block", "block", "cache line", and "line" are interchangeable. In some embodiments, a block may also be the unit of allocation and deallocation in a cache. The number of bytes in a block may be varied according to design choice, and may be of any size. As an example, 32 byte and 64 byte blocks are often used.

Conflict, or collision, misses occur within a set-associative or a direct-mapped cache when too many blocks map to a same set, and, therefore, one or more blocks need be discarded within that set. A particular cache may have two or more sources that use the cache for data storage. For example, one or more processor cores, one or more graphics processing units (GPUs), one or more input/output (I/O) devices, or other may access a particular cache. These sources may not equally share the storage resources of the cache. The system performance degradation experienced from an increased average memory latency of a source may not be equal for each source.

For example, a set-associative shared cache, which may be a L2 or a L3 cache in a memory hierarchy, may be utilized for data storage by two on-die processor cores, or cores, a graphics processor unit (GPU), and multiple input/output (I/O) devices. To allocate space for new data to be stored in this cache, such as a fill cache line following a cache miss, typical cache implementations allow the Least Recently Used (LRU) way within a chosen set to be replaced. Since this allocation strategy does not distinguish requests from different sources, it may allow one source, such as an I/O source, to occupy a significant portion of the ways in the cache, which may be undesirable. Data blocks of a core may now be evicted within this chosen set, which degrades the average memory latency seen by the core in the system.

In view of the above, efficient methods and mechanisms for data allocation in a memory of a computing system are desired.

SUMMARY OF THE INVENTION

Systems and methods for data allocation in a shared cache memory of a computing system are contemplated. In one embodiment, a computing system comprises one or more processor cores and a shared set-associative cache. Each cache way of the shared cache is accessible to multiple sources, wherein the multiple sources are configured to generate memory requests. A shared cache controller is configured to enable or disable cache fill line allocation separately to each of the cache ways based upon a corresponding source of a received memory request. Each of the multiple sources may be at least one of the following: a processor core, a graphics processing unit (GPU), and an input/output (I/O) device.

One or more configuration and status registers (CSRs) are coupled to the shared cache controller for storing encoding values used to enable and disable said allocation separately to each of the shared cache ways. The programming of the stored values in the CSRs may make each of the shared cache ways available for allocation subsequent a cache miss by only one or more preselected sources. Therefore, a particular first source, such as an I/O device, may not have allocation availability to a particular cache way subsequent a cache miss in order to avoid undesirable evictions of data of a second source, such as a processor core. The control of the allocation availability of the shared cache ways via altering stored values in one or more CSRs may also be used to both create a pseudo-RAM structure within the shared cache and progressively reduce the size of the shared cache during a power-down sequence while the shared cache continues operation.

These and other embodiments will become apparent upon reference to the following description and accompanying drawings.

Figure 1:
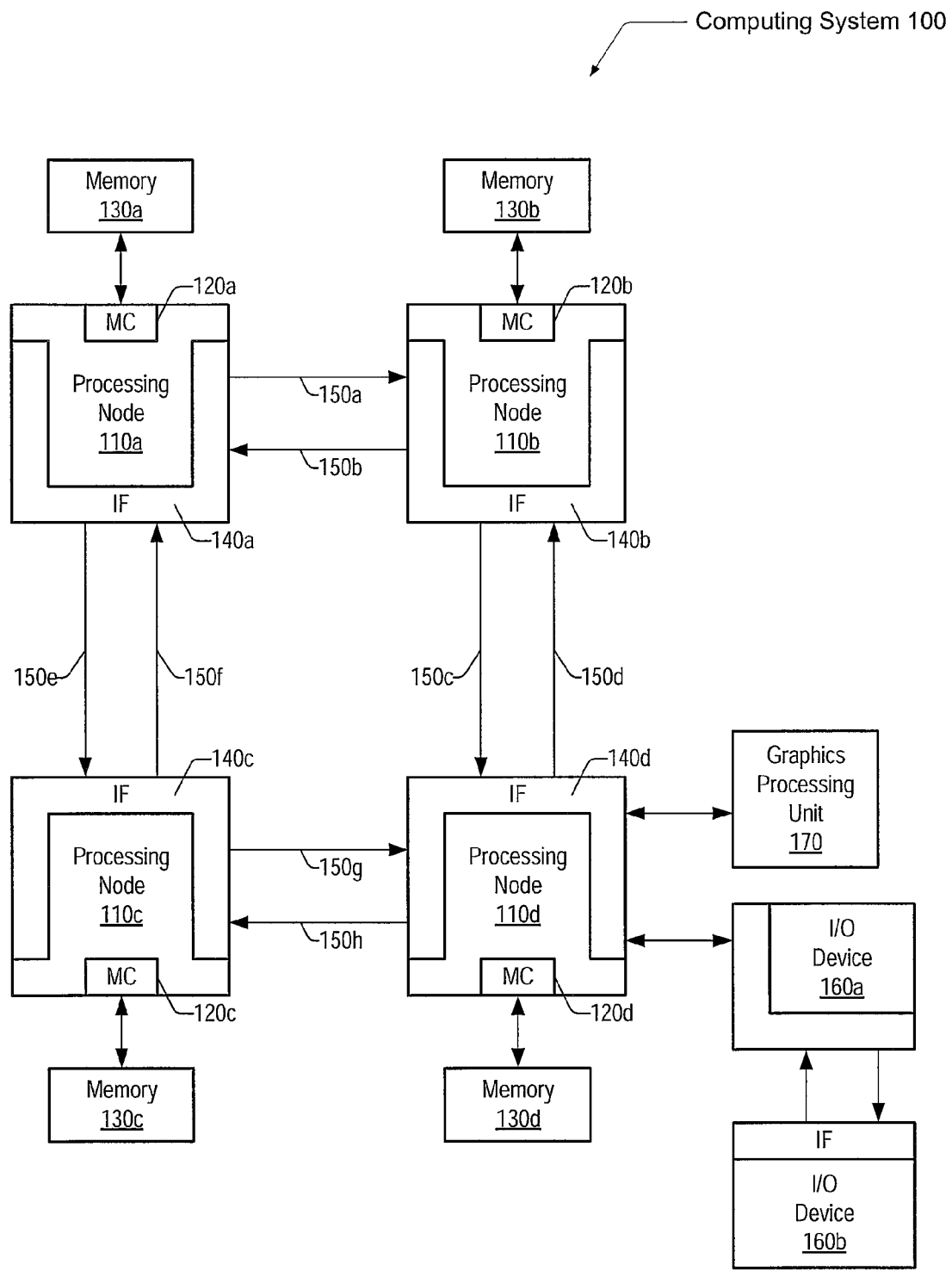
FIG. 1 is a generalized block diagram illustrating one embodiment of a computing system.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

In the following description, numerous specific details are set forth to provide a thorough understanding of the present invention. However, one having ordinary skill in the art should recognize that the invention may be practiced without these specific details. In some instances, well-known circuits, structures, and techniques have not been shown in detail to avoid obscuring the present invention.

Referring to FIG. 1, one embodiment of a computing system 100 is shown. Generally speaking, computing system 100 includes a plurality of processing nodes 110a-110d. As used herein, elements referred to by a reference numeral followed by a letter may be collectively referred to by the numeral alone. For example, processing nodes 110a-110d may be collectively referred to as processing nodes 110, or nodes 110. Although four nodes 110 are shown in FIG. 1, other embodiments may comprise one, two, six, or any different number of nodes, wherein each node 110 comprises one or more processor cores.

Each node 110 may be coupled to a respective memory 130 via a respective memory controller 120. Additionally, each processing node 110 may include interface logic 140 used to communicate with others of the processing nodes 110. For example, processing node 110a includes interface logic 140a for communicating with processing nodes 110b and 110c. Similarly, processing node 110b includes interface logic 140b for communicating with processing nodes 110a and 110d, and so on. In the embodiment of FIG. 1, processing node 110d is shown coupled to communicate with an input/output (I/O) device 160a via interface logic 140d. I/O device 160a is further coupled to a second I/O device 160b. Further, processing node 110d is shown coupled to communicate with a graphics processing unit (GPU) 170. Other processing nodes may communicate with other I/O devices, other GPUs, or other components in a similar fashion. Alternatively, a processing node 110 may communicate with an I/O bridge, which is coupled to an I/O bus.

In one embodiment, computing system 100 may have only one processing node 110, such as node 110d shown coupled to I/O devices 160 and a GPU 170. Examples of such an embodiment may include a mobile laptop system, a desktop, an entry-level server system, a mid-range workstation, or other. For such an embodiment, a single processing node 110 may internally utilize a system bus controller for communication. One example of a system bus controller is the AMD-762™ Northbridge system bus controller.

In another embodiment, computing system 100 may include multiple processing nodes 110. For such an embodiment, computing system 100 may implement a packet-based link for inter-node communication. In the depicted embodiment, the link is implemented as sets of unidirectional lines (e.g. lines 150a are used to transmit packets from processing node 110a to processing node 110b and lines 150b are used to transmit packets from processing node 110b to processing node 110a). Other sets of lines 150c-150h are used to transmit packets between other processing nodes as illustrated in FIG. 1.

The links 150 may be operated in a cache coherent fashion for communication between processing nodes or in a non-coherent fashion as a daisy-chain structure between I/O devices 160a-160b (and additional I/O devices, as desired). It is noted that a packet to be transmitted from one processing node 110 to another may pass through one or more intermediate nodes. For example, a packet transmitted by processing node 110a to processing node 110d may pass through either processing node 110b or processing node 110c as shown in FIG. 1. Any suitable routing algorithm may be used. Other embodiments of computing system 100 may include more or fewer processing nodes than the embodiment shown in FIG. 1. In addition, other embodiments are possible in which each processing node is coupled to every other processing node through a point-to-point network.

In addition to the depicted memory controller and interface logic, each processing node 110 may include one or more processors and associated caches, as described further below. Broadly speaking, a processing node 110 comprises at least one processor and may optionally include a memory controller for communicating with a memory and other logic, as desired.

Memories 130 may comprise any suitable memory devices. For example, a memory 130 may comprise one or more RAMBUS dynamic random access memories (DRAMs), synchronous DRAMs (SDRAMs), DRAM, static RAM, etc. The address space of computing system 100 is divided among memories 130. Each processing node 110 may include a memory map used to determine which addresses are mapped to which memories 130, and hence to which processing node 110 a memory request for a particular address should be routed. In one embodiment, the coherency point for an address within computing system 100 is the memory controller 120 coupled to the memory storing bytes corresponding to the address. Memory controllers 120 may comprise control circuitry for interfacing to memories 130. Additionally, memory controllers 120 may include request queues for queuing memory requests.

Generally, interface logic 140 may comprise buffers for receiving packets from the link and for buffering packets to be transmitted upon the link. Computing system 100 may employ any suitable flow control mechanism for transmitting packets. I/O devices 160 are illustrative of any desired peripheral devices. For example, I/O devices 160 may comprise network interface cards, video accelerators, audio cards, hard or floppy disk drives or drive controllers, Small Computer Systems Interface (SCSI) adapters and telephony cards, modems, sound cards, and a variety of data acquisition cards such as General Purpose Interface Bus (GPIB) or field bus interface cards.

Figure 2:
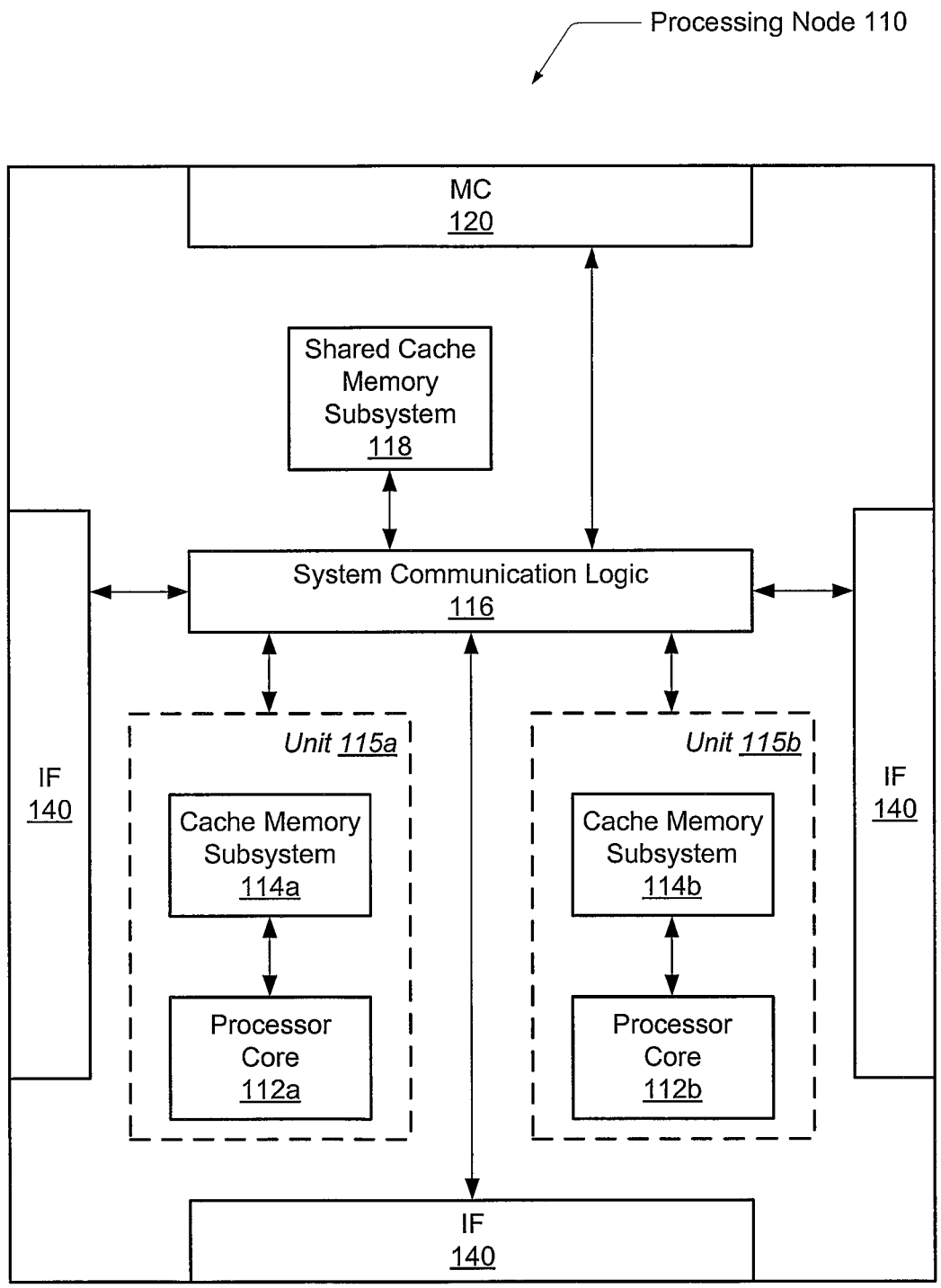
FIG. 2 is a generalized block diagram illustrating one embodiment of an exemplary processing node

FIG. 2 is a block diagram of one embodiment of an exemplary processing node 110. Circuit portions that correspond to those of FIG. 1 are numbered identically. Processing node 110 may include memory controller 120, interface logic 140, one or more processing units 115, which may include a processor cores 112 and a corresponding cache memory subsystems 114; system communication logic 116, and a shared cache memory subsystem 118. In one embodiment, the illustrated functionality of processing node 110 is incorporated upon a single integrated circuit. In another embodiment, the illustrated functionality is incorporated in a chipset on a computer motherboard.

In one embodiment, processing node 110 is a stand-alone system within a mobile computer, a desktop, or other. In one embodiment, system communication logic 116 is a system bus. In another embodiment, processing node 110 incorporates a Northbridge system bus controller in logic 116 in order to couple units 115 to memory 130, I/O devices 160, a GPU 170, or other. In such an embodiment, system communication logic 116 may replace or incorporate the functionality of memory controller 120 and interface logic 140. In one embodiment, logic 116 may incorporate both a Northbridge and a Southbridge system bus controller. A Northbridge protocol may be used to couple units 115 to memory 130 and GPU 170. A Southbridge protocol may be used to couple units 115 to I/O Devices 160, a real time clock, power management unit, or other. One example of such an embodiment of logic 116 may include the AMD-762™ Northbridge system controller and the AMD-768™ Southbridge peripheral bus controller.

In another embodiment, processing node 110 is one socket of a multi-socket system. System communication logic 116 may incorporate packet processing logic in such an embodiment. Generally speaking, system communication logic 116 may be configured to respond to control packets received on the links to which processing node 110 is coupled, to generate control packets in response to processor cores 112 and/or cache memory subsystems 114, to generate probe commands and response packets in response to transactions selected by memory controller 120 for service, and to route packets for which node 110 is an intermediate node to other nodes through interface logic 140. Interface logic 140 may include logic to receive packets and synchronize the packets to an internal clock used by packet processing logic within logic 116.

Processor cores 112 include circuitry for executing instructions according to a predefined instruction set. For example, the x86 instruction set architecture (ISA) may be selected. Alternatively, the Alpha, PowerPC, or any other instruction set architecture may be selected. Generally, processor core 112 accesses the cache memory subsystems 114, respectively, for data and instructions. As used herein, the term "access" regarding a cache memory subsystem refers to performing a read or a write request operation that may result in a cache hit if the requested data of a corresponding request address resides in the cache or a cache miss if it does not reside in the cache.

If a cache miss occurs, such as a requested block is not found in cache memory subsystem 114 or in shared cache memory subsystem 118, then a read request may be generated and transmitted to the memory controller within the node to which the missing block is mapped. A corresponding cache fill line with the requested block may be conveyed to the corresponding cache in order to complete the original read or write request. In addition, the cache fill line may be placed within a corresponding set within the cache. If there are no available ways within the corresponding set, then typically a Least Recently Used (LRU) algorithm determines which way within the set is to have its data evicted and replaced by the cache fill line data. As used herein, the term "allocate" refers to storing a cache fill line fetched from a lower level of the cache hierarchy into a way of a particular cache subsequent a cache miss to the particular cache.

Cache subsystems 114 and 118 may comprise high-speed cache memories configured to store blocks of data. Cache memory subsystems 114 may be integrated within respective processor cores 112. Alternatively, cache memory subsystems 114 may be coupled to processor cores 112 in a backside cache configuration or an inline configuration, as desired. Still further, cache memory subsystems 114 may be implemented as a hierarchy of caches. Caches located nearer processor cores 112 (within the hierarchy) may be integrated into processor cores 112, if desired. In one embodiment, cache memory subsystems 114 each represent L2 cache structures, and shared cache subsystem 118 represents an L3 cache structure. In another embodiment, cache memory subsystems 114 each represent L1 cache structures, and shared cache subsystem 118 represents an L2 cache structure. Other embodiments are possible and contemplated.

Both the cache memory subsystem 114 and the shared cache memory subsystem 118 may include a cache memory, or cache array, coupled to a corresponding cache controller. In one embodiment, the cache controller for a set-associative shared cache memory subsystem 118 may include programmable configuration and status registers (CSRs) and logic. The CSRs and corresponding logic may be utilized to segment the cache array of subsystem 118 into multiple independent sections in order to prevent the various sources that use subsystem 118 from allocating data subsequent a cache miss, such as a cache fill line, in the same regions.

Data already presently stored in the cache may be hit for a read or a write access by any source despite the values stored in the CSRs. For example, the cache may have modified data, and, therefore, lower levels of the memory hierarchy may have corresponding stale data. The requesting source should receive the updated copy of the requested cache line. Therefore, for a particular way within a particular set of a shared cache, an access from any source is still permitted, but allocation due to a cache miss is determined by the values stored in the CSRs. Such a scheme may limit eviction of useful data, or pollution of the shared cache by data that is not useful. Although access is permitted by any source, a range of addresses for access may be predetermined for each source.

Figure 3:
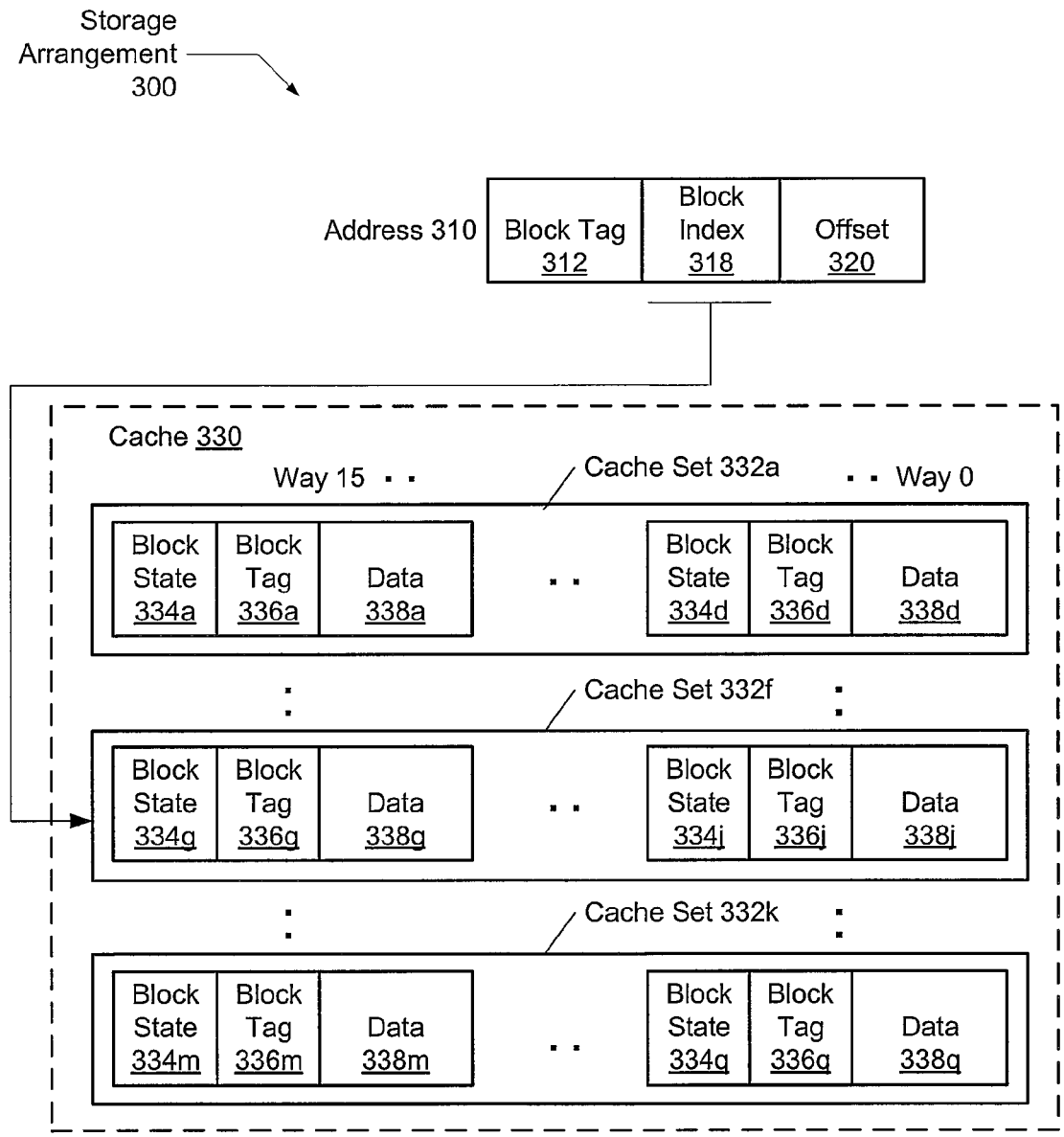
FIG. 3 is a generalized block diagram illustrating one embodiment of a set-associative cache storage arrangement.

Data may be stored within an array of shared cache memory 118 in various manners. For example, FIG. 3 illustrates one embodiment of a storage arrangement 300 in which data are stored using a 16-way set-associative cache organization. A different number of ways, such as 4-way, 8-way, or other, within the set-associative cache may be chosen. A given cache set 332 may be selected from other sets by a block index 318 portion of an address 310 used to access a set-associative cache, such as the shared cache memory subsystem 118. A cache block hit may occur when the block tags 312 and 336 contain a same value and a corresponding block state 334 designates predetermined match values such as a valid cache block.

In one embodiment, the data portion 338 of a cache line, or cache block, within cache 330 is configured to store 64 bytes. Other sizes are possible and contemplated. Each of the 16 ways of cache 330 may also store state information 334. This block state 334 may comprise at least one or more of the following: a valid bit, a cache block owner encoding that indicates the source which owns the corresponding cache block, Least Recently Used (LRU) eviction information used in association with a cache replacement algorithm employed by a cache controller, an indication that designates a cache coherency state such as modified, exclusive, owned, shared, invalid, or other. Other included state information is possible and contemplated. A block tag 336 may be used to determine which of the 16 cache lines are being accessed within a chosen cache set 332. In addition, offset 320 of address 310 may be used to indicate a specific byte or word within a cache line.

A cache set 332 may be chosen by the block index 318 of address 310. Although block state 334 and block tag 336 may be stored in contiguous bits with data 338 within each cache way, in one embodiment, block state 334 and block tag 336 may be stored in a separate array, rather than in a same array as data 338.

It may be useful to control the allocation of data storage of memory requests subsequent a cache miss within the cache array. If there is no available way within a corresponding set of the particular cache, then a currently stored cache line within the corresponding set needs to be evicted. Typically, a Least Recently Used (LRU) scheme is utilized to choose a currently stored cache line for eviction. For instance, core 112a and core 112b may be permitted to allocate only in certain sections of shared cache 118, an I/O device may be limited to allocate a separate section, and a graphics processing unit (GPU) may be limited to allocate only in yet another separate section.

For example, regarding the storage arrangement in cache 330, core 112a may be permitted to allocate only in ways 15 to 12, core 112b may be permitted to allocate only in ways 11 to 8, a GPU may be permitted to allocate only in ways 7 and 6, and three separate I/O devices may be permitted to allocate only in 2 ways each, such as ways 5 and 4, ways 3 and 2, and ways 1 and 0, respectively. Therefore, cores 112a and 112b each are able to allocate ¼ of a shared cache, and a GPU 170 and each of the three I/O devices 160 each are able to allocate ⅛ of the same shared cache. A mechanism to provide predetermined permissions for allocations will be described shortly. In this manner, these sources may efficiently share the cache array of subsystem 118 by maintaining non-shared, independent data storage associated with each source in separate sections. In one embodiment, as described in the example, cores 112 may have larger sections of shared cache 118 for data allocation than a GPU 170 and any I/O devices 160.

It is noted that a write operation cache hit into a particular way by a source that does not have permission to allocate is still performed as usual. Using the above example, an I/O Device 160 may not have permission to allocate into way 15. If I/O Device 160 performs a read operation of a cache line within a particular set and a cache miss occurs, a cache fill line containing the requested cache line is fetched from a lower level of the memory hierarchy. This cache fill line is used to complete the read operation. Subsequently or simultaneously, a mechanism, such as a Least Recently Used (LRU) algorithm, may be extended to choose a cache way to be replaced within a predetermined number of ways within a corresponding cache set rather than choose among all the cache ways within the cache set. An encoded value stored in a corresponding CSR may be used to determine cache ways 1 and 0 may only be used for allocation for this I/O Device 160. A subsequent eviction may only occur within cache ways 1 and 0, and the least recently used cache way of these two cache ways may be chosen. In one embodiment, if I/O Device 160 performs a write operation into a particular set and a cache hit occurs into way 15, then I/O Device 160 may modify data within way 15.

In another embodiment, cores 112a and 112b may share data, but this data may not be shared with a GPU 170 or three separate I/O devices 160. Both cores 112a and 112b may be permitted to allocate only ways 15 to 8, the GPU 170 may be permitted to allocate only ways 7 and 6, and the three separate I/O devices 160 may be permitted to allocate only 2 ways each, such as ways 5 and 4, ways 3 and 2, and ways 1 and 0, respectively. Therefore, cores 112a and 112b each have permission to allocate ½ of the shared cache, and the GPU 170 and each of the three I/O devices 160 each have permission to allocate ⅛ of the same shared cache.

In one embodiment, configuration and status registers (CSRs) may be used to store encoded values in order to control the allocation space for each source, such as core 112a, an I/O device 160, a GPU 170, or other, that uses a designated cache in the system, such as cache memory subsystem 118. For example, the partitioning of a 16-way set-associative designated cache based on the source of a memory request may utilize a 5-bit mask encoding. One example of encoding values is shown in Table 1.

TABLE 1

16-Way Set-Associative Cache Way Enable Control

| Table Entry | Encoding | Significance |
| --- | --- | --- |
| 1 | 00111 | All ways enabled. |
| 2 | 0x011 | 8 ways enabled, bit 3 specifies which half |
| 3 | 0xx01 | 4 ways enabled, bits 3:2 specify which quarter |
| 4 | 0xxx0 | 2 ways enabled, bits 3:1 specify which eighth |
| 5 | 1xx01 | 4 ways disabled, bits 3:2 specify which quarter |
| 6 | 1xxx0 | 2 ways disabled, bits 3:1 specify which eighth |
| 7 | 10111 | All ways disabled. |

The encodings shown above in Table 1 may control the allocation space for each source that shares the designated cache in the system. In one embodiment, a 5-bit CSR for core 112a may be programmed to store the value '00011', such as table entry 2 in Table 1, which allows core 112a to allocate data in half of the 16 ways of cache 118. These particular ways may be designated ways 7 to 0, wherein the ways are numbered 15 to 0 from left to right within a set of the cache similar to the example storage arrangement of cache 330 in FIG. 3. Other labeling schemes are possible and contemplated.

Similarly, a 5-bit CSR for a GPU 170 may store the value '01001', such as table entry 3 in Table 1, which allows the GPU to allocate data in 4 of the 16 ways of cache 118. These particular ways may be designated ways 11 to 8. A third 5-bit CSR for a first I/O device 160 may store the value '01100', such as table entry 2 in Table 1, which allows the first I/O device to allocate data in 2 of the ways of cache 118. These particular ways may be designated ways 13 to 12. Finally, a fourth 5-bit CSR for a second I/O device 160 may store the value '01110', such as table entry 4 in Table 1, which allows the second I/O device to allocate data in 2 of the ways of cache 118. These particular ways may be designated ways 15 to 14. Again, cache 118 may utilize a different number of ways and the encodings of Table 1 may be altered to accommodate a different number of ways, such as a 4-way, an 8-way, or other set-associative choice.

It is noted that a region of a cache, such as ways 1 and 0, or ⅛ of a 16-way set-associative cache, may be disabled for allocation by all sources, which simultaneously may enable other regions of the cache for allocation by all sources. In one embodiment, a global CSR may be utilized by all sources in addition to each source utilizes a corresponding individual CSR. An encoded value stored in the global CSR may override encoded values stored in the individual CSRs. For example, in one embodiment, a global CSR may be programmed to store the value '10000', such as table entry 6 of Table 1. This value according to Table 1, disables for allocation by any source ways 1 and 0 of a corresponding set-associative cache. Additional ways, other than ways 1 and 0, of the cache may be disabled for allocation by a particular source according to a corresponding individual CSR, but ways 1 and 0 are guaranteed to be disabled regardless of the individual CSR's stored encoded value. In another embodiment, rather than utilize a global CSR, each individual CSR for a particular source may have its contents modified in order to disable ways 1 and 0. Now the information stored in ways 1 and 0 are prevented from being victimized by a later fill transaction. These particular ways, ways 1 and 0 in this case, may have been previously used for allocation. More details of such use are provided later.

In one embodiment, a cache controller for cache 118 within processing node 110 is aware of the source of a particular cache access request, and, therefore, the cache controller and corresponding logic knows which CSR to access for cache way-enable and way-disable control. In one embodiment, both the assignment of a particular CSR to a particular source and the stored value of a particular CSR are set by basic input output software (BIOS) during boot-up of a system. Therefore, the assignments and values are set only once, which may be done for security reasons, although, BIOS may be altered, or updated, at a later time. In another embodiment, firmware dynamically loaded by a device driver and transparently updated through the operating system update mechanisms may be used to alter both assignment and stored values of the CSR if such permission is granted. In yet another embodiment, other software mechanisms may be utilized to program and re-program the assignment and stored values of the CSRs, such as offering control for certain applications to a software programmer. Again, such control may be limited due to security reasons.

Table 2 below expands the encodings shown in Table 1. Regarding Table 2, in one embodiment, a logic '1' in Vector [15:0] may define an enabled way within the designated set-associative cache, and a logic '0' may define a disabled way.

TABLE 2

Expanded Encoding of Enable Control

| Table Entry | Encoding | Vector[15:0] |
|---|---|---|
| 1 | 00000 | 0000 0000 0000 0011 |
| 2 | 00001 | 0000 0000 0000 1111 |
| 3 | 00010 | 0000 0000 0000 1100 |
| 4 | 00011 | 0000 0000 1111 1111 |
| 5 | 00100 | 0000 0000 0011 0000 |
| 6 | 00101 | 0000 0000 1111 0000 |
| 7 | 00110 | 0000 0000 1100 0000 |
| 8 | 00111 | 1111 1111 1111 1111 |
| 9 | 01000 | 0000 0011 0000 0000 |
| 10 | 01001 | 0000 1111 0000 0000 |
| 11 | 01010 | 0000 1100 0000 0000 |
| 12 | 01011 | 1111 1111 0000 0000 |
| 13 | 01100 | 0011 0000 0000 0000 |
| 14 | 01101 | 1111 0000 0000 0000 |
| 15 | 01110 | 1100 0000 0000 0000 |
| 16 | 01111 | Reserved |
| 17 | 10000 | 1111 1111 1111 1100 |
| 18 | 10001 | 1111 1111 1111 0000 |
| 19 | 10010 | 1111 1111 1111 0011 |
| 20 | 10011 | 1111 1111 0000 0000 |
| 21 | 10100 | 1111 1111 1100 1111 |
| 22 | 10101 | 1111 1111 0000 1111 |
| 23 | 10110 | 1111 1111 0011 1111 |
| 24 | 10111 | 0000 0000 0000 0000 |
| 25 | 11000 | 1111 1100 1111 1111 |
| 26 | 11001 | 1111 0000 1111 1111 |
| 27 | 11010 | 1111 0011 1111 1111 |
| 28 | 11011 | 0000 0000 1111 1111 |
| 29 | 11100 | 1100 1111 1111 1111 |
| 30 | 11101 | 0000 1111 1111 1111 |
| 31 | 11110 | 0011 1111 1111 1111 |
| 32 | 11111 | Reserved |

As stated earlier, configuration and status registers (CSRs) may be used to store encoded values, such as values shown in Table 1 or Table 2, in order to control the allocation space within a shared resource for each source. For example, as discussed above, an I/O request source may be programmed to allocate only 2 ways of a 16-way set-associative cache, such as ways 15 and 14 of the cache. This may be achieved by programming a CSR corresponding to these I/O requests to store the 5-bit value '01110'. Table entry 4 of Table 1 and table entry 15 of Table 2, both corresponding to the 5-bit value '01110', illustrate that ways 15 and 14 are enabled for this encoding. Such an encoding in the above embodiment may not allow I/O requests to allocate more than ⅛ of the storage in a shared cache.

In addition to utilizing the source of a memory request for allocation of a shared resource, such as a set-associative cache, the type of memory request may also be used. The type of memory request may be utilized by logic, such as control logic within a cache controller, to determine if the memory request is permitted to allocate a corresponding cache line of a particular way of the shared cache. The type of memory request, which may be encoded in an opcode, and a value stored in a CSR may both be utilized by control logic to determine both whether to allocate a cache line during a cache fill transaction resulting from a cache miss and into which way of a corresponding set is a cache fill line allocated. Further details are provided shortly. Generally speaking, for a read request that hits the cache, the data portion of the corresponding cache line is not modified. However, the status information, such as coherency state, LRU information, or other may be updated. For a read request that misses the cache, the data portion of the corresponding requested cache line, again, is not modified, although the state information may be updated. The missing corresponding cache line may have been fetched from a lower level of the memory hierarchy. This corresponding cache line may or may not be stored, or allocated, in the shared cache depending on predetermined cache line fill requirements.

Again, generally speaking, for a write request that hits the cache, the data portion of the corresponding cache line is modified if other requirements are satisfied such as cache coherency, ownership status, and/or other. In addition, updates may occur to the corresponding state information. A write request that misses the shared cache may allow the data portion of the fetched cache fill line to be modified, again, if other requirements are satisfied. Similarly to a read request miss, the corresponding cache line for a write miss may have been fetched from a lower level of the memory hierarchy. This corresponding cache line may or may not be stored, or allocated, in the shared cache depending on predetermined cache line fill requirements.

Control logic that determines a cache line fill requirement may utilize the instruction type of an incoming memory request in addition to the encoding information based on source, such as the examples shown in Tables 1 and 2. A shareable cache may support multiple different types of requests. Some examples of supported memory requests by a shareable cache are shown in Table 3.

TABLE 3

Supported Memory Request Types.

| Request Opcode Pneumonic | Source | Significance |
|---|---|---|
| RDBLKM | Core | Fill request associated with a processor core store operation that signifies a read request with intent to modify the line after invalidating other caching agents that hold this line. |
| RDBLK | Core | Fill request associated with a processor core load operation that signifies a read request with intent of using the line without change or modifying it only if the requesting core receives the cache line in the "E" or "Exclusive" state as no other caching agents in the system hold this line. |
| RDBLKS | Core | Fill request associated with a processor core instruction cache miss that signifies a read request without intent of modification. |
| CH2DIRTY | Core | Change to dirty request which indicates a core has a shared copy of a cache line and wants to modify the line after invalidating other shared copies in the system. |
| CLVICBLK | Core | Eviction of a clean line from the core caches to caches below a predetermined hierarchy |

TABLE 3-continued

Supported Memory Request Types.

| Request Opcode Pneumonic | Source | Significance |
|---|---|---|
| | | level. This request may be used as a book keeping transaction to maintain an accurate state for a shareable cache. |
| WRVICBLK | Core | Eviction of a dirty cache line from the core caches, which signifies a write request to the memory system. |
| RDSZ | I/O Device, Core | Coherent sized read of memory such as various double word quantities within a given cache line. |
| WRSZ | I/O Device, Core | Coherent sized write of memory such as various double word quantities within a given cache line. |

The combination of the source and the memory request type may provide flexibility for users to program the conditions under which the data portion(s), and simultaneously the corresponding state information, of a cache line is allocated. Only a predetermined type of request from a given request source may be considered for allocation into the cache. In one embodiment, the programmability may be provided by the addition of one or more CSRs in the system for each command type from each source with encodings similar to the encodings shown in Table 2. This programmability may be enforced on a per transaction basis by the cache controller. Requests that are not programmed for allocation do not allocate into the cache during a cache miss.

In another embodiment, the programmability may be provided by the addition of one or more CSRs in the system for each source of a memory request with encodings similar to the encodings in Table 2. In the case of a cache fill event due to a cache miss, the opcode, or the type of the command, of the memory request may be utilized by logic in the cache controller to determine whether or not the cache fill line is permitted to allocate into the cache and possibly cause an eviction of another cache line within the same set of the cache. A table encoding value based on the source, such as the examples in Table 2, may allow such an allocation to occur, although this encoding value may limit which way of a set may be allocated, but the command type may override this permission and prevent the allocation. In yet another embodiment, a CSR storing a predetermined value may exist for each source as described earlier, but the values in one or more CSRs may be altered due to an incoming command type. The changing of the predetermined values may only be allowed if security restrictions allow it to occur. For example, the CSR values may not be permitted to be changed based on execution of a typical software application.

This added feature may be very useful since the user may choose which type of request is permitted to allocate into the cache. For example, when a CLVICBLK memory request misses in the cache, it may be beneficial to not allocate this line into the cache as clean victims need to be tracked only for better probe filtering results. Also, for a particular I/O device 160, wherein the data for this device is scarcely used, read and write memory requests from this particular I/O device 160 that miss in a shareable cache may inadvertently cause eviction of useful data for a processor core. In such a situation, a significant portion of the shareable cache may store data that will not be used again while useful information is evicted. Thus, system performance may suffer. The programmability described by Tables 1-3 and enforced by logic within a cache controller may help to avoid such a situation and increase system performance.

Further, the system architecture may support the addition and use of predetermined hint bits to be included with the memory requests, such as in corresponding packets, in one embodiment. This hint information may be bits located contiguously with an opcode or placed elsewhere within a memory request instruction or packet. Similar to the opcode or command type information, the logic within a cache controller may utilize these hint bits to determine whether or not the corresponding memory request is permitted to allocate into a shareable cache, such as during a fill event resulting from a cache miss.

In one embodiment, these hint bits may be used alone, rather than in addition to the memory request type supplied by the opcode. In another embodiment, these hint bits may be used along with the opcode in order to make such a determination. For example, a first value of the hint bits may indicate the opcode alone should be used for the determination. A second value of the hint bits may indicate the opcode value is bypassed and only the hint bits are used for the determination. A third value may indicate both the hint bits and the opcode value need to be considered for the determination. Other combinations, which may be used in a state diagram, are possible and contemplated.

As described earlier, in one embodiment, a table encoding value based on the source, such as the examples in Table 2, may allow a fill event to allocate into a shared cache, but the hint bits, or a combination of the hint bits and command type, may override this permission and prevent the allocation. In yet another embodiment, a CSR storing a predetermined value may exist for each source as described earlier, but the values in one or more CSRs may be altered due to the hint bits of an incoming command type. The changing of the predetermined values may only be allowed if security restrictions allow it to occur. Again, the CSR values may not be permitted to be changed based on execution of a typical software application written by a typical user.

The per-transaction-based-indication supplied by the hint bits may be useful in situations wherein it is highly unlikely that data belonging to a particular transaction ever be reused, and therefore, no fill mechanism allocates this data into the cache after a miss according to a predetermined table, such as Table 2, although the memory request instruction type may be cache modifiable. In one embodiment, this feature may be used extensively for an I/O request source, such as an I/O device 160. Such a mechanism may prevent pollution of the cache.

Figure 4:
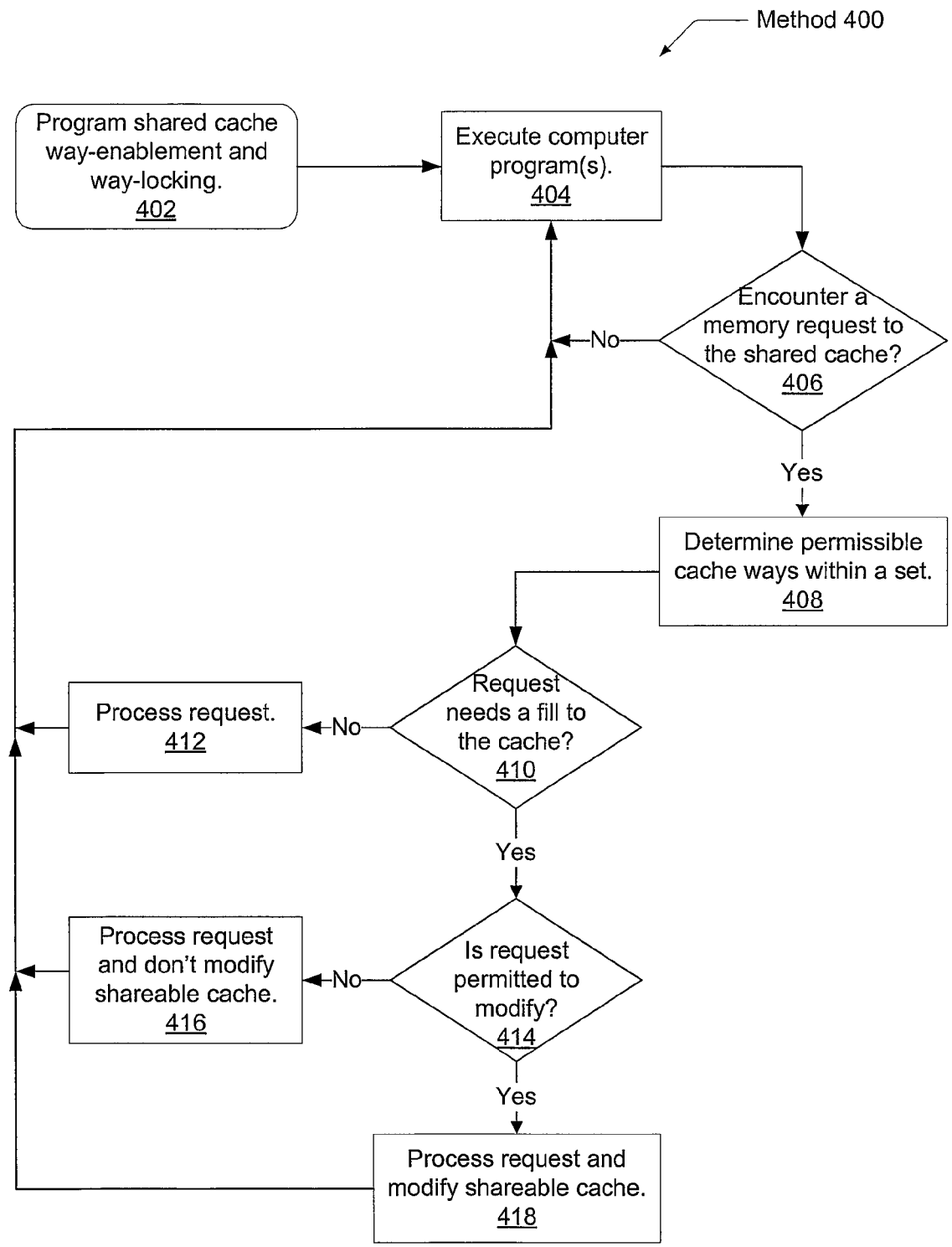
FIG. 4 is a flow diagram of one embodiment of a method for efficient allocation of data in a shared resource

FIG. 4 illustrates a method 400 for efficient allocation of data in a shared resource. Method 400 may be modified by those skilled in the art in order to derive alternative embodiments. Also, the steps in this embodiment are shown in sequential order. However, some steps may occur in a different order than shown, some steps may be performed concurrently, some steps may be combined with other steps, and some steps may be absent in another embodiment. In the embodiment shown, initial assignments used to determine which sub-portions of a shared resource are enabled or disabled for allocation by incoming operations are set in block 402. For example, initial encoding values defined in a table, such as Table 2, may be stored in appropriate CSRs.

One or more computer programs, or software applications, execute in block 404. These applications may be executed by one or more processor cores 112, graphic processing units (GPUs) 170, I/O devices 160, or other. These entities that execute software applications may each access a shareable resource such as a data cache. In one embodiment, the shareable resource may be a shareable L2 or L3 cache such as shared cache memory subsystem 118 in FIG. 2. The accesses, or memory requests, of a shared cache by processor cores 112 may have a higher impact on system performance than the accesses originating from other sources such as the GPUs 170 or the I/O devices 160.

When a memory request is presented to a shared cache (conditional block 406), a determination of allowable ways for allocation within a corresponding set of the shared cache is performed in block 408. The source of the memory request is known and may be used to access a corresponding CSR whose stored value determines the collection of allowable ways within a corresponding set. In other embodiments, the memory request type and/or hint bits may also be used to determine the collection of allowable ways as described earlier regarding Table 3.

If the memory request misses the cache, and thus, requires the correct line to be retrieved from lower-level memory (conditional block 410), then a determination is performed as to whether or not the fill line is permitted to be allocated into the shared cache (conditional block 414). This determination may be based upon the source, the command type, which may be determined by an opcode; hint bits included in the instruction or packet, a combination of these factors, or other.

If it is determined the memory request is not permitted to allocate into the shared cache (conditional block 414), then the operation of the memory request may proceed in block 416, such as reading or writing the contents of a retrieved fill line, but the fill line is not placed in the shared cache. For example, an I/O device 160, which is known not to reuse corresponding data, may be programmed by values stored in a corresponding CSR to not be able to allocate values into the shared cache subsequent a cache miss. Thus, more space in the shared cache may be utilized for other sources such as one or more processor cores 112 or a GPU 170.

If it is determined the memory request is permitted to allocate the shared cache subsequent a cache miss (conditional block 414), then the operation of the memory request may proceed in block 418, such as reading or writing the contents of a retrieved fill line, and additionally, the fill line is placed in the shared cache. During placement into the shared cache, the contents of the CSRs may determine which cache ways are allowable to be modified. For example, core 112a may be permitted to modify, or allocate, half of the cache, such as ways 15 to 8. However, an I/O Device 160 may be permitted to modify, or allocate, only ⅛ of the cache, such as ways 5 and 4. For a set that is already full, eviction of a cache line based on a LRU scheme may occur during the allocation process. In addition, if a set is not full, but all of the allowable ways of the set for a particular source, such as ways 5 and 4 for an I/O Device 160 in the above example, are full, then eviction of a cache line based on a LRU or other scheme may occur during the allocation process.

The above methods may also be used to load and lock, or prevent from being evicted, certain designated lines of a cache. These locked lines may be disabled for allocation by all sources. These locked lines may be used as a pseudo-random-access-memory (RAM). Such a mechanism may be subsequently used to enable Basic Input Output Software (BIOS) to load and lock sections of the cache during system boot-up. For example, such a mechanism may be used to allow the BIOS to use a cache, such as the shared cache 118 or other, for general storage when the dynamic random-access-memory (DRAM) in the system has not yet been initialized. This feature may decrease the amount of time required for system boot-up.

The BIOS may now utilize certain segments in the cache to store data structures without these locked lines being evicted by other sources. For example, such a cache-way-locking scheme may ensure that the lines where BIOS stores data will not be evicted when the system performs other fill requests to the cache, such as a read operation of boot code from I/O space such as a programmable-read-only-memory (PROM) image.

Figure 5:
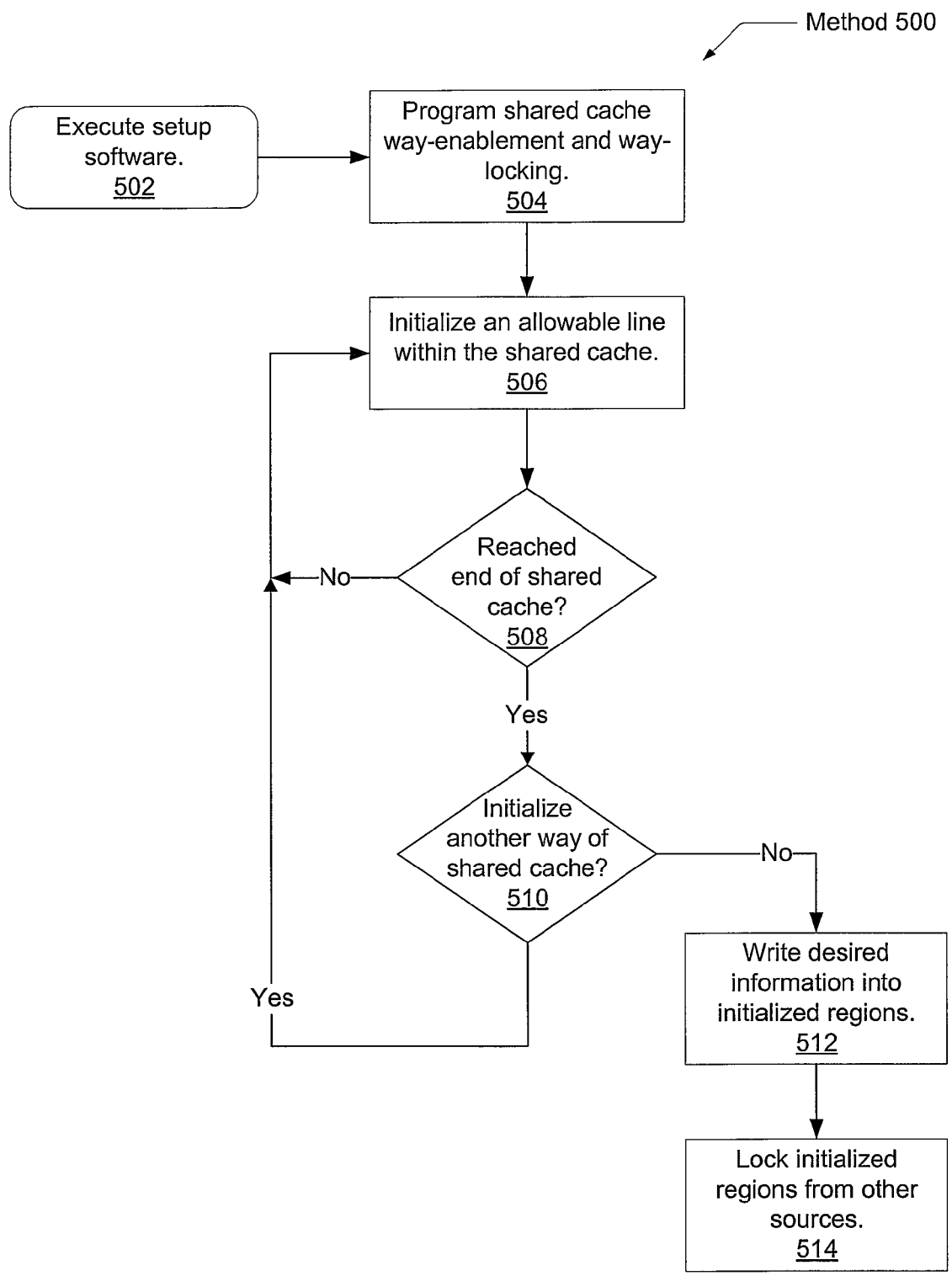
FIG. 5 is a flow diagram of one embodiment of a method for an efficient cache line locking mechanism.

Turning now to FIG. 5, a method for an efficient cache line locking mechanism is shown. Method 500 may be modified by those skilled in the art in order to derive alternative embodiments. Also, the steps in this embodiment are shown in sequential order. However, some steps may occur in a different order than shown, some steps may be performed concurrently, some steps may be combined with other steps, and some steps may be absent in another embodiment. In the embodiment shown, setup software for a computing system is executed in block 502.

In block 504, one or more CSRs in the system may be programmed to store values that indicate permission to allocate specific ways in a shared cache. For example, table entry 1 of Table 2 corresponding to the encoding value of "00000" may be used to allow allocation into ways 1 and 0 of a 16-way set-associative shared cache. A region the size of ⅛ of the total size of the shared cache may be mapped in this manner and used as a pseudo-RAM.

Next, in block 506, setup software, such as BIOS, may initialize a location within the pseudo-RAM that has the same size and alignment of a cache line of the shared cache. To perform this initialization, BIOS may map a cache line to a write-back DRAM that has yet to be initialized and issue a load, or read, operation to at least 1 byte of this cache line location. The resulting fill transaction that is issued as part of this load may be sent to a disabled memory controller that has not initialized DRAM. The memory controller may return a data value of all logic 0's and complete the pending fill request. This data is then allocated into the shared cache. BIOS may later perform a store, or write, operation to this cache line only after it has been allocated to the shared cache.

If the end of the shared cache has not been reached (conditional block 508), such as the last un-initialized cache line corresponding to an allowable way being initialized, then control flow of method 500 returns to block 506. Otherwise, another allowable way of the shared cache may be initialized (conditional block 510) in a similar manner. If all allowable ways of the shared cache are already initialized (conditional block 510), then in block 512, setup software, such as BIOS, may store desired information into these initialized regions. In block 514, these modified lines may be locked into the shared cache by disabling allocation for the same ways that were previously used for allocation. For example, ways 1 and 0 may now be disabled for allocation by setting the corresponding CSR to hold the value stored in table entry 17 of Table 2, "10000". Now ways 1 and 0 are prevented from being allocated by other sources or evicted by younger fill transactions.

In addition, the above methods of allocation may be used to place a fraction or all of a cache in a power-down state by progressively reducing the size of the cache while the cache is still operating. It may be desirable for system level power management to turn-off or gate power to sections of a cache while keeping other sections functional. Otherwise, latencies may be introduced that reduce system performance as the cache ceases all functionality while certain sections are powered down and evictions and reloading of cache lines occur to avoid aliasing problems. Progressively reducing the cache in size via a power down mechanism as the cache continues to operate creates several intermediate cache sleep states with different performance and power dissipation characteristics. System power management hardware monitoring the cache may use these different states to trade-off between application performance and battery life. In addition, such a power down sequence may be used for caches suffering from manufacturer failures. Such a cache may be down-binned, or cut in half, and sold at a lower price.

The enabling and disabling for allocation of particular ways within a set-associative cache via programmable encoding values, such as the values specified in Table 1 and Table 2, may be used to progressively cut the size of the cache while the cache still operates and eventually shut down the entire cache. For example, from an encoding value of "00111", such as table entry 8 of Table 2 above, wherein all ways in a 16-way set-associative cache are enabled for allocation, it may be possible to progressively transition to other encoding values that continually reduce the size of the cache such as "10000" (table entry 17 which enables 14 ways), "10001" (table entry 18 which enables 12 ways), "01011" (table entry 12 which enables 8 ways), "01101" (table entry 14 which enables 4 ways), "01110" (table entry 15 which enables 2 ways), and finally "10111" (table entry 24 which disables all ways).

The above progression may be more efficient than directly halving the cache by reducing the index portion of a corresponding address by a single bit. In addition, halving the cache by reducing the index portion of the address may place other addresses that normally are placed in the powered-down half of the cache into the powered-up, down-sized cache instead. Such a scenario thereby creates additional work of evicting these addresses when it is later decided that the cache needs to increase in size again.

Figure 6:
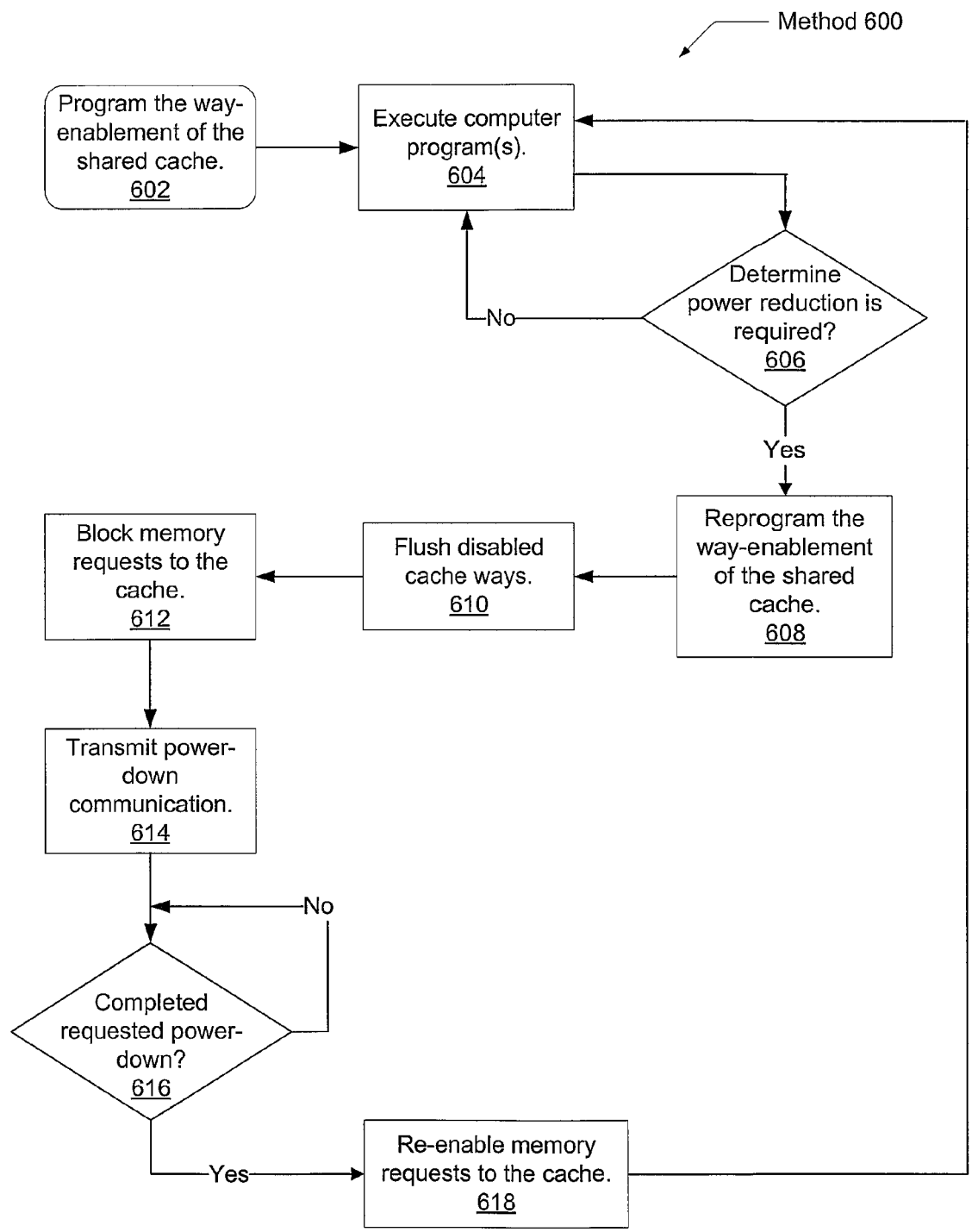
FIG. 6 is a flow diagram of one embodiment of a method for an efficient cache sector power-down sequence.

Referring now to FIG. 6, a method for an efficient cache sector power-down sequence is shown. As with methods 400 and 500, additional methods, such as method 600, may be modified by those skilled in the art in order to derive alternative embodiments. Also, the steps in this embodiment are shown in sequential order. However, some steps may occur in a different order than shown, some steps may be performed concurrently, some steps may be combined with other steps, and some steps may be absent in another embodiment. In the embodiment shown, initial assignments used to determine which sub-portions of a shared resource are enabled or disabled for allocation by incoming operations are set in block 602. For example, initial encoding values defined in a table, such as Table 2, may be stored in appropriate CSRs.

One or more computer programs, or software applications, execute in block 604. These applications may be executed by one or more processor cores 112, graphic processing units (GPUs) 170, I/O devices 160, or other. These entities that execute software applications may each access a shareable resource such as a data cache. In one embodiment, the shareable resource may be a shareable L2 or L3 cache such as shared cache memory subsystem 118 in FIG. 2. The accesses, or memory requests, of a shared cache by the processor cores 112 may have a higher impact on system performance than the accesses originating from other sources such as the GPUs 170 or the I/O devices 160.

When a power-down condition is determined to exist (conditional block 606), the values stored in one or more CSRs, such as initial encoding values defined in a table, such as Table 2, may be altered in block 608. A power-down condition may exist when incoming signals from either inside or outside the processing system, such as processing node 110 in FIG. 1, to a cache controller indicate certain cache sectors should be powered-down. In one embodiment, the cache controller corresponds to a shared cache within the processing system. Several power-down mechanisms may be used by those skilled in the art to provide such indications.

The incoming power-down indications to the cache controller or other logic may be used to determine the manner by which the encoded values stored by CSRs progressively transition. The affected CSRs may include individual CSRs for particular sources, a single master CSR corresponding to the entire cache, a combination, or other. In one embodiment, the cache controller changes the current stored encoding values in order to disable particular sectors of the cache for allocation via way masking. In one embodiment, a single master CSR for the entire cache may exist. For a particular source, the allowable ways of the cache to be used for memory request allocation may be determined by logic with both the master CSR and the source-specific CSR stored values as inputs. For power-down or power-up sequences, the single master CSR may only be modified versus each CSR for each source. Therefore, only a single transition may be utilized such as described above (e.g. "00111" to "10000" to "10001" and so forth). In another embodiment, a separate transition may be used for each CSR in the system.

In block 610, the cache controller transitions through the sets of the cache, such as accessing each possible index either one by one or accessing multiple indexes and corresponding sets at a time if supporting circuitry exists, and flushes the contents of the cache ways that are disabled. The cache itself is still functional during this step and memory requests are still processed.

In one embodiment, when the flushing is complete, the cache controller blocks the processing of memory requests to the entire cache in block 612. In another embodiment, when the flushing is complete, the cache controller blocks the processing of memory requests to only disabled cache ways of the cache in block 612. Therefore, memory request accesses may be selectively blocked for only disabled ways or memory request accesses may be blocked for the entire cache. Following, in block 614, the cache controller transmits power-down communication to the cache array. For example, a command may be issued from the cache controller to the cache array in order to power-down the targeted sector of the cache via way masking. The power-down process may require several clock cycles, which may be known or unknown at the time of the power-down request. When an indication is provided that the power-down of the cache array is completed (conditional block 616), the cache controller re-enables memory requests to access the cache in block 618. This step may re-enable access to the entire cache if beforehand the entire cache was disabled for memory request accesses. Otherwise, this step may be skipped if beforehand only memory requests to disabled cache ways were prevented from access. Control flow of method 600 then returns to block 604 where only enabled cache ways are accessed during the execution of computer programs.

Figure 7:
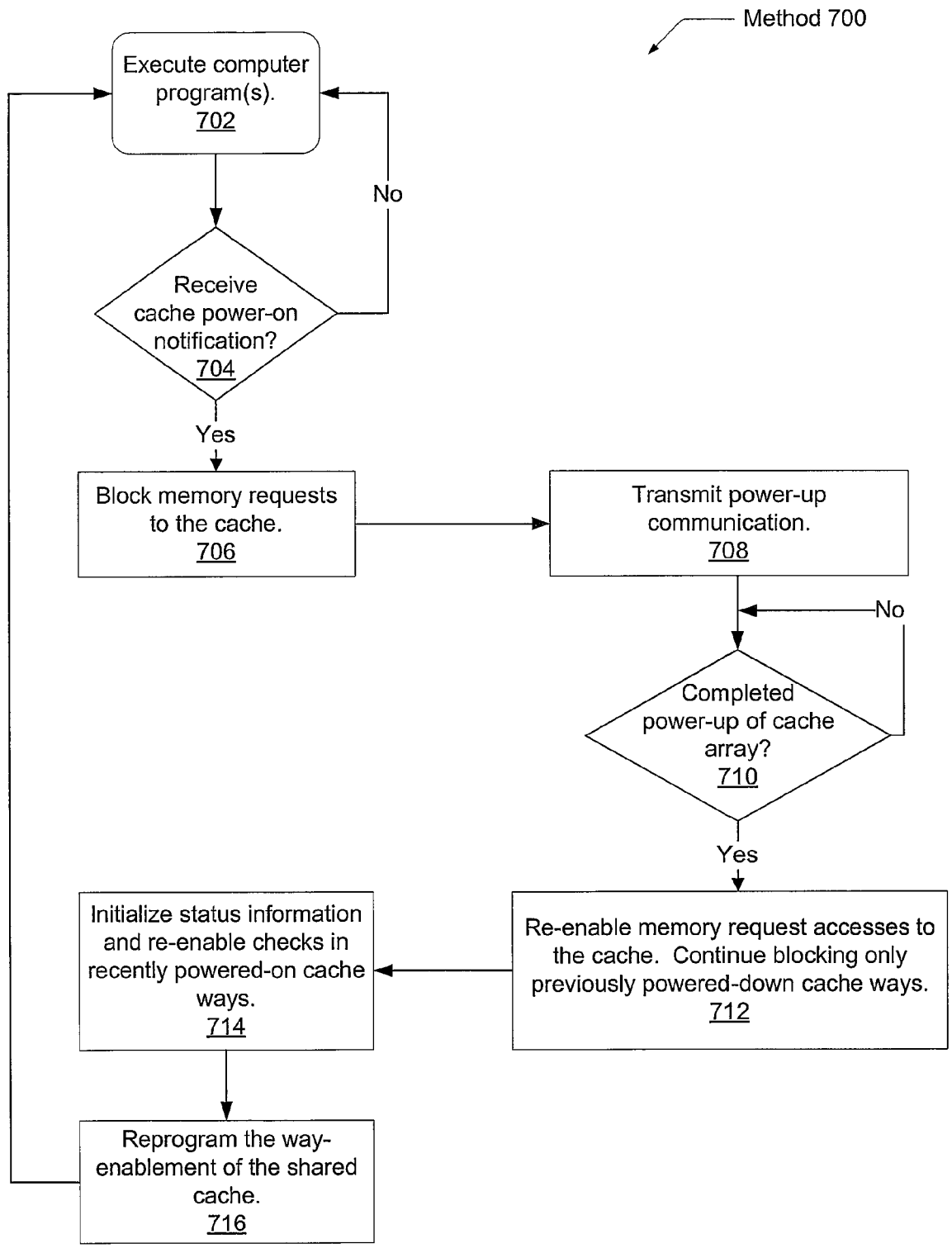
FIG. 7 is a flow diagram of one embodiment of a method for an efficient cache sector power-up sequence.

Turning now to FIG. 7, a method for an efficient cache sector power-up sequence is shown. One or more computer programs, or software applications, execute in block 702. These applications may be executed by one or more processor cores 112, graphic processing units (GPUs) 170, I/O devices 160, or other. These entities that execute software applications may each access a shareable resource such as a data cache. This shared cache may have had certain sectors, or portions, previously powered down, such as by a method similar to method 600.

When a power-up condition is determined to exist, such as by corresponding logic, or a power-up notification is received (conditional block 704), in one embodiment, the cache controller blocks the processing of memory requests to the entire cache in block 706. In another embodiment, when a power-up condition is determined to exist, the cache controller may simply continue blocking the processing of memory requests to only disabled (previously powered-down) cache ways of the cache. Therefore, memory request accesses may continue to be selectively blocked for only disabled ways or memory request accesses may be blocked for the entire cache. In one embodiment, the cache sectors to be powered-up may be all disabled (previously powered-down) cache ways of the cache. In another embodiment, the cache sectors to be powered-up may be determined by encoded values stored in individual CSRs for particular sources, a single master CSR corresponding to the entire cache, a combination, or other.

Following, in block 708, the cache controller transmits power-up communication to the cache array. For example, a command may be issued from the cache controller to the cache array in order to power-up the targeted sector, or portions, of the cache. Again, the targeted sector may be determined by encoded values stored in one or more CSRs. The power-up process may require several clock cycles, which may be known or unknown at the time of the power-up request. In one embodiment, the cache array drives nodes and wire routes of the new sector to full logic 0 and 1 values using wakeup transistors. Once this step is complete, the array turns on full-power transistors. Then an internal initialization is performed, wherein internal blocking bits are set.

When an indication is provided that the power-up of the cache array is completed (conditional block 710), the cache controller re-enables memory requests to access the cache in block 712 if access to the entire cache was previously disabled. However, simultaneously, the cache controller may utilize cache way masking to prevent memory requests from accessing the recently powered on sector. In another embodiment, the cache may update status information to indicate the recently powered on sector is inactive. In an alternative embodiment, both way masking and status information may both be used to prevent memory requests from accessing the recently powered on sectors of the cache while accesses to the previously powered on sectors resume.

In block 714, regarding the recently powered on sectors, or cache ways, status information is initialized and cache checks are re-enabled. In one embodiment, the cache controller uses a state machine to sequence through the recently powered-on cache ways through direct-way accesses and the corresponding valid bits are reset. Also, the hit and parity checking logic is re-enabled. An initial cache coherency protocol state may be set to an invalid state. Again, parallel with this step, accesses by memory requests to other sectors of the cache occur.

Upon the completion of the steps in block 714, the cache array may send a corresponding indication to the cache controller. Following, in block 716, now that the cache way masking is enabled for the recently powered on sector, the values stored in one or more CSRs, such as the initial encoding values defined in a table, such as Table 2, may be altered, or reprogrammed, in block 716. Note that initial accesses to the recently powered-on cache ways may experience cache misses, and subsequent allocation may be determined based at least in part on the encoded values stored in one or more CSRs. For a recently powered-on cache way, an initial cache miss may not require eviction of invalid data.

Although the embodiments above have been described in considerable detail, numerous variations and modifications will become apparent to those skilled in the art once the above disclosure is fully appreciated. It is intended that the following claims be interpreted to embrace all such variations and modifications

What is claimed is:

1. A computing system comprising:
a first source configured to generate memory requests;
a second source different from the first source configured to generate memory requests;
a shared cache comprising a first portion of one or more entries and a second portion of one or more entries different from the first portion; and
a shared cache controller coupled to the shared cache, wherein the shared cache controller is configured to:
determine the first portion is permitted to have data allocated by the first source but not by the second source; and
determine the second portion is permitted to have data allocated by the second source but not by the first source;
perform said determining based upon identification of either the first source or the second source as a source of a command comprising a corresponding memory request and at least one of the following: a command type of the corresponding memory request, and hint bits, wherein said hint bits are part of the command sent by the source and are distinct from the identification of the source; and
wherein data stored in either the first portion or the second portion may be hit for a read or a write access by either of the first source or the second source.

2. The computing system as recited in claim 1, wherein the shared cache controller is further configured to determine the first portion is not permitted to have data allocated by the first source based on at least one of the following: the command type of the given memory request, and the hint bits included in the command.

3. The computing system as recited in claim 2, wherein said shared cache controller is further configured to disable access to selected portions of the shared cache which are powered down by storing encoded values in a control status register.

4. The computing system as recited in claim 2, wherein each of the first source and the second source is at least one of the following: a processor core, a graphics processing unit (GPU), and an input/output (I/O) device.

5. The computing system as recited in claim 4, wherein said shared cache controller is further configured to determine the first portion is permitted to have data allocated by one and only one source of a plurality of sources.

6. The computing system as recited in claim 5, further comprising one or more configuration and status registers (CSRs) coupled to said shared cache controller for storing encoded values used for said determinations of the first portion and the second portion.

7. The computing system as recited in claim 6, wherein said shared cache is a set-associative cache and said first portion and said second portion correspond to at least one cache way.

8. The computing system as recited in claim 1, further comprising storing system setup information utilized by basic input output software (BIOS) in a locked portion of said shared cache while one or more other sources are permitted access to said shared cache, wherein the locked portion is determined not to be permitted to have data evicted during system boot-up by the one or more other sources.

9. The computing system as recited in claim 1, wherein an identification of a source of a given transaction may provide a first indication as to how said data is to be allocated and hint bits included in the command may override the first indication and provide a different indication as to how said data is to be allocated.

10. A method comprising:
generating memory requests by a first source;
generating memory requests by a second source different from the first source;
determining a first portion comprising one or more entries of a shared cache is permitted to have data allocated by the first source but not by the second source; and
determining a second portion comprising one or more entries of the shared cache is permitted to have data allocated by the second source but not by the first source;
performing said determining based upon identification of either the first source or the second source as a source of a command comprising a corresponding memory request and at least one of the following: a command type of the corresponding memory request, and hint bits, wherein said hint bits are part of the command sent by the source and are distinct from the identification of the source; and
wherein data stored in either the first portion or the second portion may be hit for a read or a write access by either of the first source or the second source.

11. The method as recited in claim 10, further comprising determining the first portion is not permitted to have data allocated by the first source based on at least one of the following: the command type of the given memory request, and the hint bits included in the command.

12. The method as recited in claim 11, further comprising disabling access to selected portions of the shared cache which are powered down by storing encoded values in a control status register.

13. The method as recited in claim 11, wherein each of the first source and the second source is at least one of the following: a processor core, a graphics processing unit (GPU), and an input/output (I/O) device.

14. The method as recited in claim 13, further comprising determining the first portion is permitted to have data allocated by one and only one source of a plurality of sources.

15. The method as recited in claim 14, further comprising storing encoded values in one or more configuration and status registers (CSRs) for said determining for the first portion and the second portion.

16. The method as recited in claim 15, wherein said shared cache is a set-associative cache and said first portion and said second portion correspond to at least one cache way.

17. The method as recited in claim 10, further comprising storing system setup information utilized by basic input output software (BIOS) in one or more locked entries of said shared entries while a plurality of sources are permitted access to said shared entries, wherein the locked entries are disabled for eviction during system boot-up by each of the plurality of sources.

18. A shared cache controller comprising:
a first interface coupled to a shared cache array comprising a first portion of one or more entries and a second portion of one or more entries different from the first portion;
a second interface configured to receive memory requests from at least a first source and a second source different from the first source; and
a control unit; and
wherein the control unit is configured to:
determine the first portion is permitted to have data allocated by the first source but not by the second source; and
determine the second portion is permitted to have data allocated by the second source but not by the first source;
perform said determining based upon identification of either the first source or the second source as a source of a command comprising a corresponding memory request and at least one of the following: a command type of the corresponding memory request, and hint bits, wherein said hint bits are part of the command sent by the source and are distinct from the identification of the source; and
wherein data stored in either the first portion or the second portion may be hit for a read or a write access by either of the first source or the second source.

19. The shared cache controller as recited in claim 18, wherein the control unit is further configured to determine the first portion is not permitted to have data allocated by the first source based on at least one of the following: the command type of the given memory request, and the hint bits included in the command.

20. The shared cache controller as recited in claim 19, wherein the control unit is further configured to disable access to selected portions of the shared cache which are powered down by storing encoded values in a control status register.

21. The shared cache controller as recited in claim 18, further comprising storing system setup information utilized by basic input output software (BIOS) in a locked portion of said shared cache while one or more other sources are permitted access to said shared cache, wherein the locked portion is determined not to be permitted to have data evicted during system boot-up by the one or more other sources.

* * * * *